(12) United States Patent
Shirai et al.

(10) Patent No.: US 9,944,555 B2
(45) Date of Patent: Apr. 17, 2018

(54) METHOD FOR PRODUCING GLASS SHEET

(71) Applicant: Asahi Glass Company, Limited, Chiyoda-ku (JP)

(72) Inventors: Masanobu Shirai, Tokyo (JP); Ryosuke Kato, Tokyo (JP); Satoshi Miyasaka, Tokyo (JP); Nobuaki Ikawa, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/079,222

(22) Filed: Mar. 24, 2016

(65) Prior Publication Data

US 2016/0200628 A1 Jul. 14, 2016

Related U.S. Application Data

(63) Continuation of application No. PCT/JP2014/075014, filed on Sep. 22, 2014.

(30) Foreign Application Priority Data

Sep. 25, 2013 (JP) .................................. 2013-198475

(51) Int. Cl.
*C03C 21/00* (2006.01)
*C03B 18/02* (2006.01)
(Continued)

(52) U.S. Cl.
CPC .......... *C03C 21/002* (2013.01); *C03B 25/093* (2013.01); *C03C 3/087* (2013.01);
(Continued)

(58) Field of Classification Search
None
See application file for complete search history.

(56) References Cited

U.S. PATENT DOCUMENTS 5,597,394 A * 1/1997 Marique ................. C03B 18/16
65/25.2
2011/0293928 A1 12/2011 Chu et al.
(Continued)

FOREIGN PATENT DOCUMENTS

EP 2 371 779 A1 10/2011
EP 2371779 A1 * 10/2011 ............. C03C 15/00
(Continued)

OTHER PUBLICATIONS

Napolitano et al., "Viscosity of a Standard Soda-Lime-Silica Glass", J. of Research of the National Bureau of Standards—A. Physics and Chemistry, vol. 68A, No. 5, 1964.*
(Continued)

*Primary Examiner* — Lisa L Herring
(74) *Attorney, Agent, or Firm* — Oblon, McClelland, Maier & Neustadtm L.L.P.

(57) ABSTRACT

A method for manufacturing a float glass includes a step of melting a glass raw material, a step of forming the glass melted in the melting step into a glass ribbon while floating the glass on a molten metal, and a step of annealing the glass ribbon. In the forming step, a gas or a liquid containing a molecule having a fluorine atom present therein is blown to the glass ribbon having a viscosity of from $1.0 \times 10^4$ to $2.5 \times 10^{10}$ Pa·s.

10 Claims, 11 Drawing Sheets

(51) Int. Cl.
  *C03B 25/093* (2006.01)
  *C03C 3/087* (2006.01)
  *C03C 15/00* (2006.01)
(52) U.S. Cl.
  CPC ............ *C03C 15/00* (2013.01); *C03C 21/007* (2013.01); *C03B 18/02* (2013.01); *Y02P 40/57* (2015.11)

(56) References Cited

U.S. PATENT DOCUMENTS

| | | | | |
|---|---|---|---|---|
| 2013/0019639 | A1* | 1/2013 | Saito | ............... C03B 27/0404 65/114 |
| 2015/0140216 | A1* | 5/2015 | Nelson | ............... C23C 16/401 427/255.393 |
| 2016/0046519 | A1* | 2/2016 | Tanaka | ............... C03B 18/20 428/220 |

FOREIGN PATENT DOCUMENTS

| | | | |
|---|---|---|---|
| JP | 61-205641 | 9/1986 | |
| JP | 62-191449 | 8/1987 | |
| WO | WO 2007/004634 A1 | 1/2007 | |
| WO | WO 2011122678 A1 * | 10/2011 | ......... C03B 27/0404 |
| WO | WO 2012/141310 A1 | 10/2012 | |
| WO | 2013/124634 A1 | 8/2013 | |
| WO | WO 2014/167842 A1 | 10/2014 | |
| WO | WO 2014167842 A1 * | 10/2014 | ............. C03B 18/20 |

OTHER PUBLICATIONS

International Search Report dated Dec. 22, 2014 in PCT/JP2014/075014, filed Sep. 22, 2014 (with English Translation).
Written Opinion dated Dec. 22, 2014 in PCT/JP2014/075014, filed Sep. 22, 2014.

* cited by examiner

METHOD FOR PRODUCING GLASS SHEET

TECHNICAL FIELD

The present invention relates to a method for manufacturing a glass sheet.

BACKGROUND ART

Recently, in flat panel display devices of mobile phones or personal digital assistances (PDAs), personal computers, televisions, car-mounted navigation display devices and the like, a thin sheet-shaped cover glass is often arranged on the front side of displays so as to cover a wider region than the image display area thereof, for protecting the displays and for improving the beauty thereof.

Such flat panel display devices are required to be lightweight and thinned, and therefore the cover glass to be used for display protection is also required to be thinned.

However, if the thickness of the cover glass is reduced, the strength thereof lowers and the cover glass itself may be broken by dropping, etc. during use or carrying. Thus, there arises a problem that its primary role of protecting the display devices cannot be fulfilled.

Consequently, in already-existing cover glass, glass produced by a float process (hereinafter this may be referred to as a float glass) is chemically strengthened to form a compressive stress layer on the surface thereof to thereby enhance the scratch resistance of the cover glass.

It has been reported that a float glass is warped after chemical strengthening to lose flatness (Patent Documents 1 to 3). It is said that the warpage may be caused by the heterogeneity between the glass surface not in contact with a molten metal such as molten tin during float forming (hereinafter this may be referred to as top surface) and the glass surface being in contact with the molten metal (hereinafter this may be referred to as bottom surface), thereby providing a difference in the degree of chemical strengthening between the two surfaces.

The warpage of the float glass becomes large with increasing the degree of chemical strengthening. Therefore, in the case where surface compressive stress is set to be higher than before, particularly 600 MPa or more, for responding to the requirement for high scratch resistance, the problem of warpage becomes more obvious.

Patent Document 1 discloses a glass strengthening method of forming an $SiO_2$ film on a glass surface and then chemically strengthening it to thereby control the amount of the ions to enter the glass during chemical strengthening. Patent Documents 2 and 3 disclose a method of reducing the warpage after chemical strengthening by controlling the surface compression stress on the top surface side so as to fall within a specific range.

Heretofore, for reducing the problem of warpage, there have been taken a coping method of reducing the strengthening stress caused by chemical strengthening or performing chemical strengthening after removing a surface heterogeneous layer by grinding treatment, polishing treatment or the like of at least one surface of glass.

PRIOR ART DOCUMENTS

Patent Document

Patent Document 1: US-A-2011/0293928
Patent Document 2: WO2007/004634
Patent Document 3: JP-A-62-191449

SUMMARY OF THE INVENTION

Problems that the Invention is to Solve

However, in the method of forming an $SiO_2$ film on a glass surface and then chemically strengthening it as described in Patent Document 1, preheating conditions during the chemical strengthening are limited, and additionally, there is a possibility that film quality of the $SiO_2$ film changes depending on the conditions, and gives influence to warpage. Furthermore, the method of controlling the surface compression stress on the top surface side so as to fall within a specific range as described in Patent Documents 2 and 3 is problematic in point of strength of glass.

The method of performing grinding treatment, polishing treatment or the like on at least one surface of glass before chemical strengthening is problematic in point of improving the productivity, and therefore it is desirable to omit the grinding treatment, the polishing treatment or the like.

In the case where warpage to a certain extent or more occurs after chemical strengthening, the gap between the glass and a stage becomes too large when printing a black frame of a cover glass, and thereby the glass may not be suctioned on the stage. Furthermore, in the case of being used in a touch panel-integrated cover glass, film formation of such as ITO (Indium Tin Oxide) is sometimes performed thereon in the state of a large sheet in a post-process. In such a case, there may occur some transport failure in which the glass would be brought into contact with an air knife in a chemical liquid processing tank or in a washing tank, or there may arise some trouble in which the warpage may increase during the formation of ITO film and therefore the ITO film formation condition in the substrate peripheral part could not be suitable and would peel away. Furthermore, in the case of a type that a space is present between LCD (Liquid Crystal Display) and the cover glass having a touch panel attached thereto, where a certain extent or more of warpage is present on the cover glass, luminance unevenness and Newton ring may occur.

Accordingly, an object of the present invention is to provide a method for manufacturing a glass sheet that can effectively suppress warpage after chemical strengthening and additionally can omit or simplify a polishing treatment or the like before chemical strengthening.

Means for Solving the Problems

The present inventors have found that in the case where the surface of a glass is subjected to fluorine treatment and a viscosity of the glass ribbon in such the case is set to a value within a certain range, the difference in the degree of chemical strengthening between one surface and the other surface of the glass can be suppressed to generate, and thereby warpage after chemical strengthening can be reduced. They have completed the present invention based on this finding.

Specifically, the present invention is as follows.

1. A method for manufacturing a float glass, including a step of melting a glass raw material, a step of forming the glass melted in the melting step into a glass ribbon while floating the glass on a molten metal, and a step of annealing the glass ribbon, in which in the forming step, a fluid containing a molecule having a fluorine atom present therein is blown to the glass ribbon having a viscosity of from $1.0 \times 10^4$ to $2.5 \times 10^{10}$ Pa·s.

2. The method for manufacturing a float glass according to 1 above, in which the viscosity is from $1.5 \times 10^4$ to $5.0 \times 10^5$ Pa·s.

Advantages of the Invention

The float glass obtained by the manufacturing method according to the present invention is that the surface of a glass sheet is subjected to a fluorine treatment to a certain depth, and a certain amount or more of fluorine is entrapped in the glass. As a result, the difference in the degree of chemical strengthening between one surface and the other surface of the glass is suppressed to generate. This reduces warpage of a glass after chemical strengthening without decreasing stress due to chemical strengthening and even though a polishing treatment or the like before chemical strengthening is simplified or omitted, thereby excellent flatness can be obtained.

BRIEF DESCRIPTION OF THE DRAWINGS (a) of FIG. 1 shows typical fluorine concentration profile by SIMS of an aluminosilicate glass. (b) of FIG. 1 shows a view in which a depth is plotted in a horizontal axis and a gradient at an arbitrary point $x_i$ represented by the Formula (a) is plotted in a vertical axis. (c) of FIG. 1 shows an enlarged view of a dotted line part in (b) of FIG. 1.

(a) to (c) of FIG. 2 show typical fluorine concentration profiles by SIMS of fluorine-treated aluminosilicate glasses.

Figure 9:
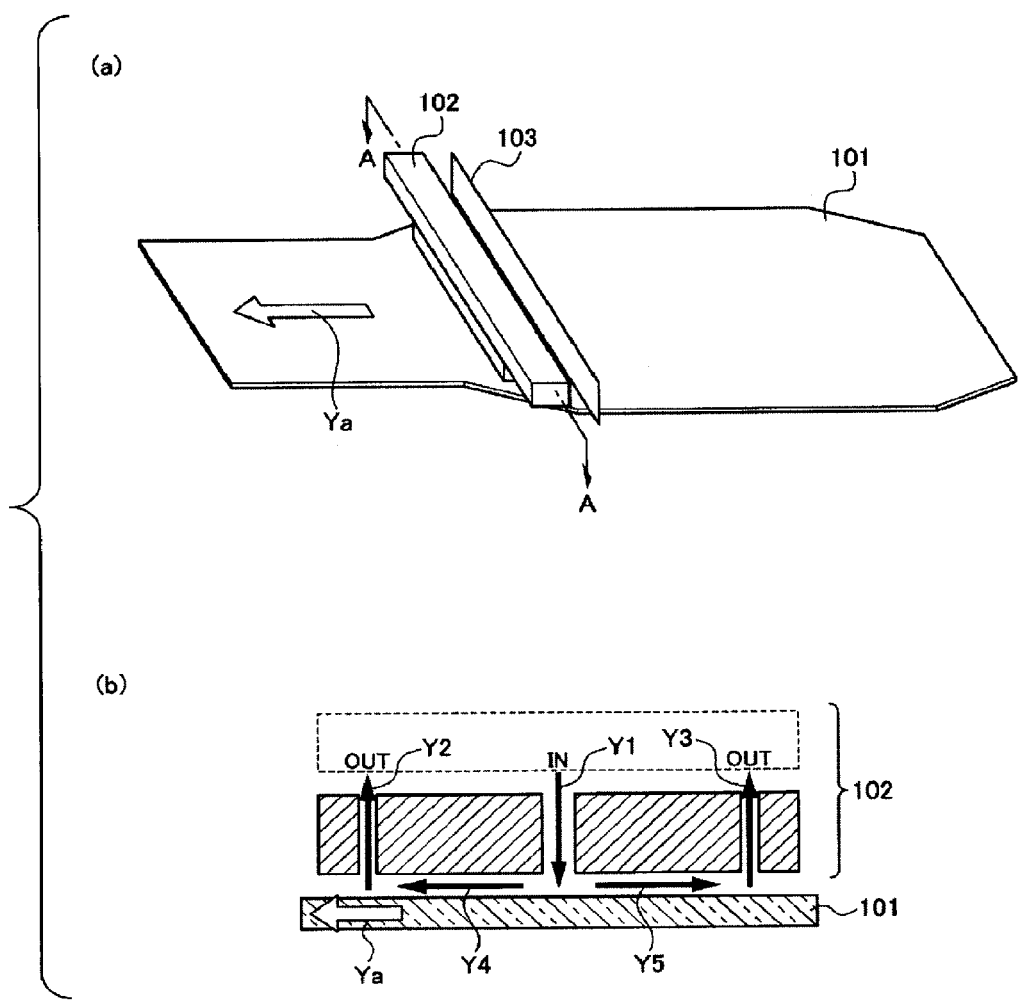

(a) of FIG. 9 is a schematically explanatory view of a method for treating the surface of a glass ribbon by supplying a gas containing a molecule having a fluorine atom present in its structure by a beam in the manufacturing of a glass sheet by a float process. (b) of FIG. 9 is a cross-sectional view taken along A-A in (a) of FIG. 9.

Figure 10:
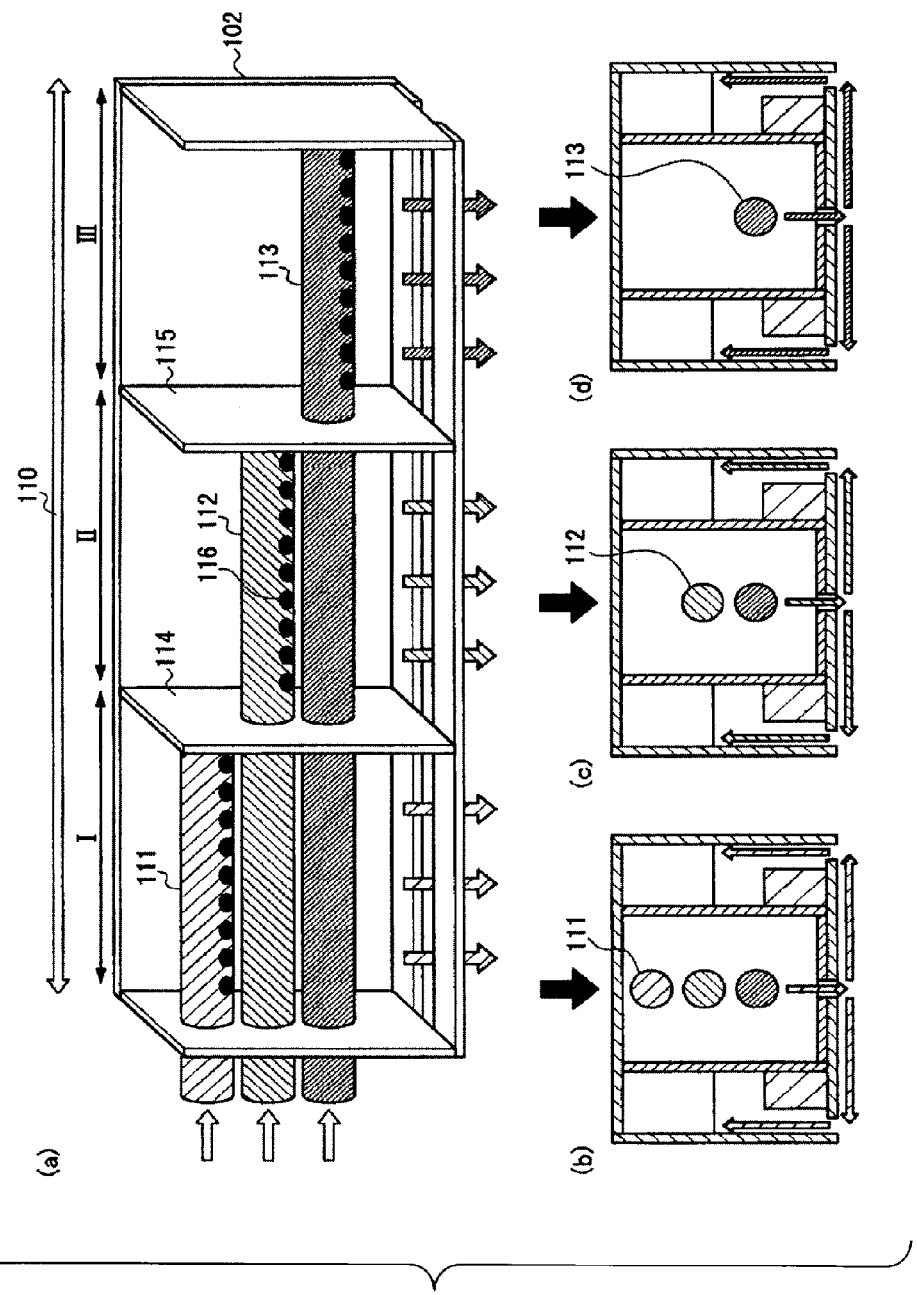

(a) to (d) of FIG. 10 illustrate cross-sectional views of a beam capable of adjusting the amount of a gas by dividing it into three in a width direction of a glass ribbon.

Figure 11:
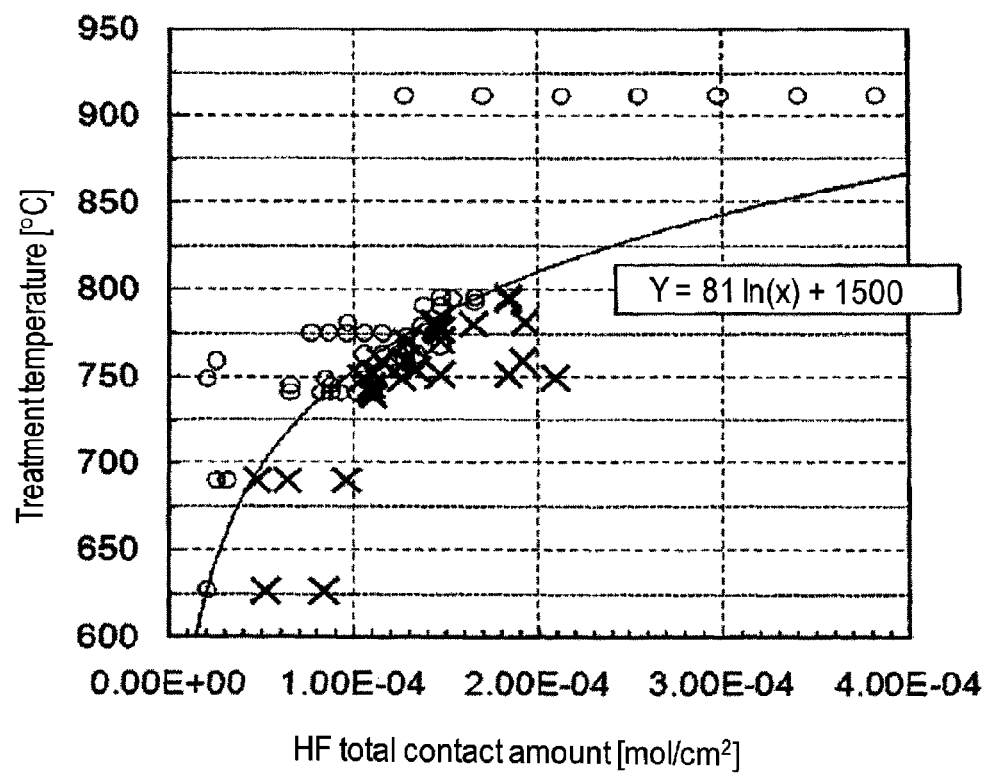

FIG. 11 shows the results obtained by plotting the presence or absence of a concave part to HF total contact amount (mol/cm$^2$) and HF treatment temperature (° C.).

Figure 12:
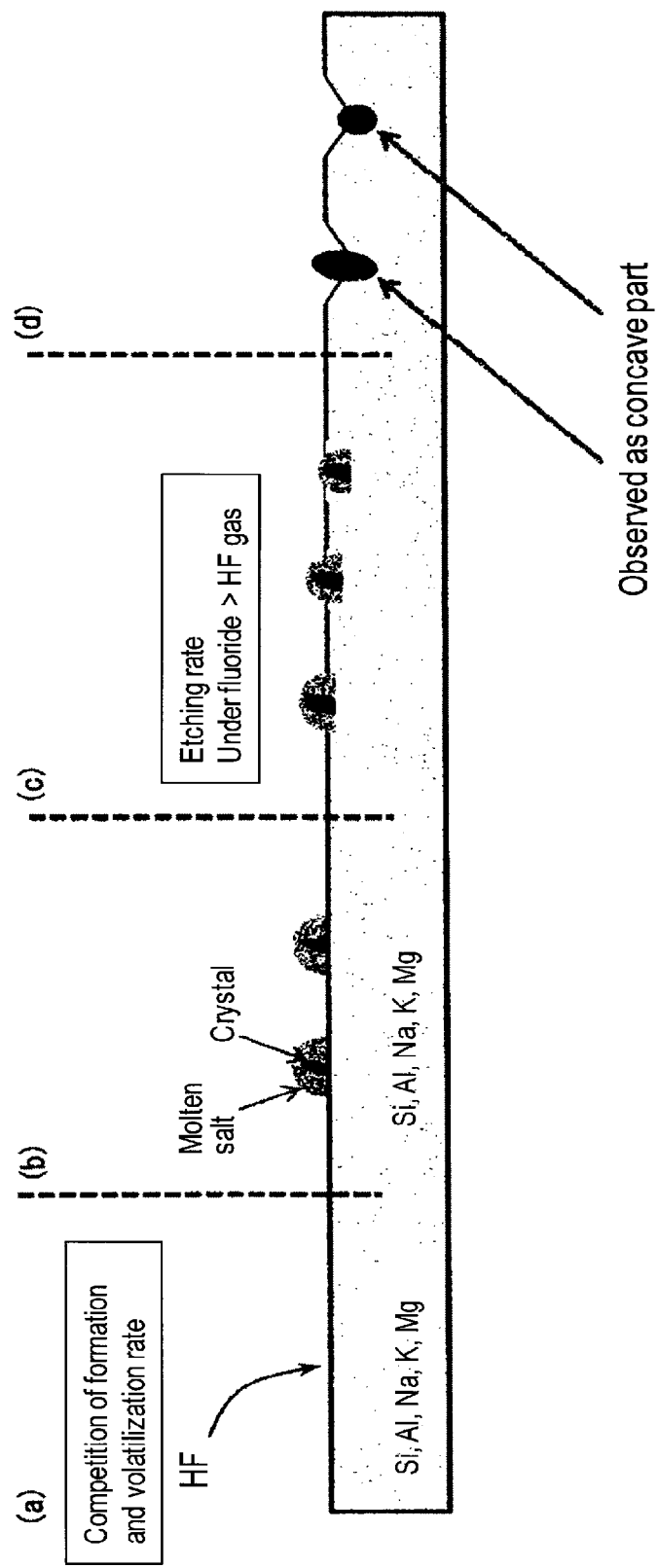

(a) to (d) of FIG. 12 illustrate explanatory views of mechanism of the generation of a concave part by HF treatment.

MODE FOR CARRYING OUT THE INVENTION

1. Glass Sheet

In the present invention, the "glass sheet" includes a molten glass formed into a sheet shape, and, for example, a so-called glass ribbon in a float bath is also a glass sheet. Warpage after chemical strengthening of a glass sheet occurs due to the difference in the degree of chemical strengthening between one surface of a glass sheet and the other surface thereof. Specifically, for example, in the case of a float glass, the degree of chemical strengthening differs between a glass surface (top surface) that is not brought into contact with a molten metal (generally tin) and a glass surface (bottom surface) that is brought into contact with the molten metal, during float forming, thereby warpage after chemical strengthening occurs.

According to the float glass obtained by the manufacturing method of the present invention, by subjecting a glass sheet to a fluorine treatment thereon to make a difference between the degree of a fluorine treatment on one surface and the degree of a fluorine treatment on the other surface, a diffusion rate of an ion on one surface and the other surface of the glass sheet is controlled, and thus the degree of chemical strengthening in one surface and the other surface can be balanced. For this reason, the glass sheet of the present invention can reduce warpage of the glass sheet after chemical strengthening without adjusting strengthening stress or performing a treatment such as grinding or polishing before a chemical strengthening treatment.

Furthermore, by changing the degree of a fluorine treatment on one surface of a glass sheet, an ion diffusion rate on a treated surface and an ion diffusion rate on an untreated surface are controlled so as to be the same, and the degree of chemical strengthening can be balanced.

As the mechanism that warpage after chemical strengthening can be reduced by subjecting the surface of a glass sheet to a fluorine treatment, it is considered that the following phenomena occur.

(1) Relaxation is accelerated by fluorine entrapped on the surface of the glass, and CS (compressive stress; surface compressive stress) on a fluorine-treated surface is decreased.

(2) Ion exchange is disturbed by the fluorine entrapped on the surface of the glass, and DOL (depth of layer; depth of compressive stress) of a fluorine-treated surface is decreased.

(3) Dealkalization of the glass occurs by the fluorine treatment.

(4) A main component on the surface of the glass changes by the fluorine treatment, and Si in the glass decreases from the surface of the glass as $SiF_4$ or $H_2SiF_6$. As a result, the degree of stress varies.

(5) Dehydration from the surface of the glass is suppressed or water enters therein, due to the fluorine treatment, and as a result, warpage is reduced.

The glass sheet obtained by the present invention is a glass sheet in which a fluorine concentration on one surface is larger than a fluorine concentration of the other surface, the surfaces facing to each other in a thickness direction, and it is preferred to satisfy the following Formula (1).

$$1 \leq x \quad (1)$$

In the Formula (1), x is a maximum depth (μm) of an arbitrary depth $x_i$ (μm) in which a gradient thereof satisfies the following Formula (2) in a fluorine concentration profile by SIMS.

$$[F(x_i+0.1)-F(x_i)]/0.1=-0.015 \quad (2)$$

In the Formula (2), $F(x_i)$ represents a fluorine concentration (mol %) by SIMS at a depth $x_i$ (μm).

Figure 1:
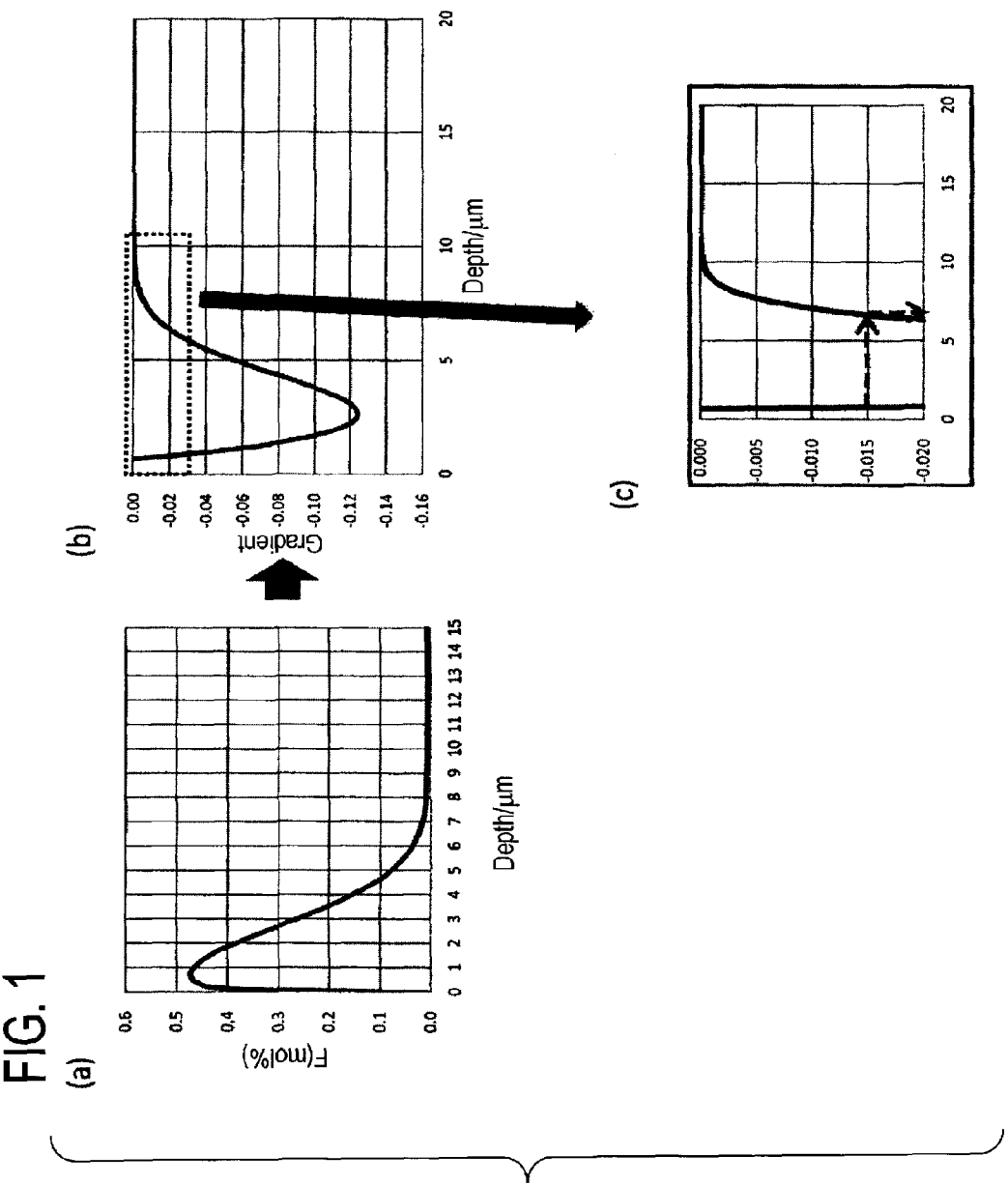
Figure 2:
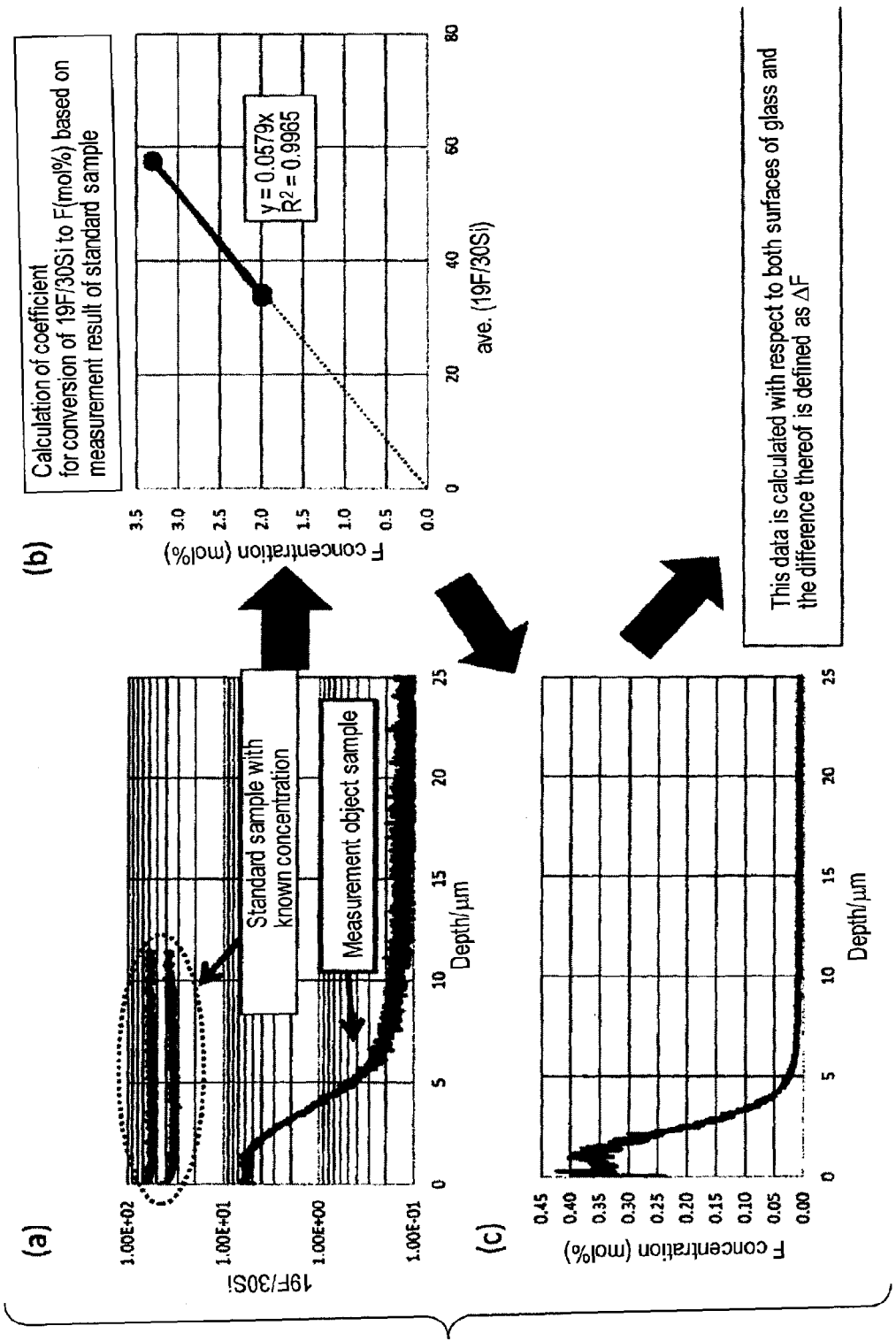

(a) of FIG. 1 shows a typical fluorine concentration profile by SIMS of an aluminosilicate glass. (b) of FIG. 1 is a graph in which a depth is plotted in a horizontal axis and a gradient at an arbitrary point $x_i$ represented by the following Formula (a) is plotted in a vertical axis. In the following Formula (a), $F(x)$ represents a fluorine concentration (mol %) at a point x.

$$[F(x_i+\Delta x)-F(x_i)]/\Delta x \qquad (a)$$

In the case where $\Delta x$ is set to 0.1, the maximum depth x (μm) at which the gradient represented by the Formula (a) is −0.015 is 1 or more, preferably 2 or more, more preferably 2.8 or more, still more preferably 3 or more, still further preferably 5 or more, particularly preferably 10 or more, and most preferably 20 or more. Where x is less than 1, significant difference is not seen in the displacement of warpage.

Secondary ion intensity $I_{M1}$ of an isotope $M_1$ of an element M in SIMS is proportional to primary ion intensity $I_P$, sputtering rate Y of a matrix, concentration $C_M$ (ratio to total concentration) of the element M, existence probability $\alpha_1$ of the isotope $M_1$, secondary ionization rate $\beta_M$ of the element M, and permeation efficiency η (including detection efficiency of a detector) of a mass spectrometer.

$$I_{M1}=A \cdot I_P \cdot Y \cdot C_M \cdot \alpha_1 \cdot \beta_M \cdot \eta \qquad (\text{Formula w})$$

Here, A is a ratio of a detection area of a secondary ion to a scanning range of a primary ion beam. Generally, it is difficult to obtain η of a device, and therefore, an absolute value of $\beta_M$ cannot be obtained. Therefore, η is deleted by using a main component element or the like in the same sample as a reference element and employing a ratio to (Formula w).

In the case where the reference element is R and its isotope is $R_j$, the following (Formula x) is obtained.

$$I_{M1}/I_{Rj}=(C_M \cdot \alpha_1 \cdot \beta_M)/(C_R \cdot \alpha_j \cdot \beta_R)=C_M/K \qquad (\text{Formula x})$$

Here, K is a relative sensitivity factor of the element M to the element R.

$$K=(C_R \cdot \alpha_j \cdot \beta_R)/(\alpha_1 \cdot \beta_M) \qquad (\text{Formula y})$$

In this case, a concentration of the element M is obtained from (Formula z).

$$C_M=K \cdot I_{m1}/I_{Rj} \qquad (\text{Formula z})$$

In the present invention, F corresponds to $M_1$ and Si corresponds to $R_j$. Therefore, from (Formula x), intensity ratio (F/Si) between those equals to a value obtained by dividing the fluorine concentration $C_M$ by K. In other words, F/Si is a direct index of the fluorine concentration.

Analysis conditions of SIMS include, for example, the following conditions. The analysis conditions shown below are an exemplification, and should be appropriately modified depending on a measuring device, a sample and the like. Furthermore, the depth on horizontal axis of a depth direction profile obtained by SIMS analysis can be obtained by measuring the depth of analysis crater with a stylus type film thickness meter (for example, Dektak 150 manufactured by Veeco).

(Analysis Conditions)
Primary ion species: $Cs^+$
Primary ion incident angle: 60°
Primary accelerated voltage: 5 kV
Further specific analysis conditions include, for example, the following conditions.

(Analysis Conditions)
Measuring apparatus: Secondary ion mass spectrometer having quadrupole mass analyzer
Primary ion species: $Cs^+$
Primary accelerated voltage: 5.0 kV
Primary ion current: 1 μA
Primary ion incident angle (angle from vertical direction of sample surface): 60°
Raster size: 200×200 μm²
Detection region: 40×40 μm²
Secondary ion polarity: Minus
Use of electron gun for neutralization: Yes
Secondary ion mass spectrometer having a quadrupole mass analyzer includes, for example, ADEPT 1010 manufactured by ULVAC-PHI, Incorporated.

It is preferred in the glass sheet obtained by the present invention that x is 10 or more. In the case where x is 10 or more, the following effects can be exhibited.

(1) DOL dependency of warpage of a glass due to chemical strengthening can be suppressed by increasing a penetration depth of fluorine into the glass and decreasing a fluorine concentration on the outermost surface of the glass.

(2) Even in the case where a glass is polished or is subjected to an etching treatment before chemical strengthening, reduction effect of warpage of a glass after chemical strengthening by a fluorine treatment can be sufficiently assured by increasing a penetration depth of fluorine into the glass.

(3) Increase of a fluorine concentration on the outermost surface of a glass by a fluorine treatment can be prevented, and it becomes possible to reduce ΔCS (difference between a value of CS of one surface and a value of CS of the other surface, which are facing to each other in a thickness direction) close to 0. Therefore, a glass not only achieving the reduction in warpage due to chemical strengthening but also excellent in point of strength can be obtained.

Fluorine penetrating into a glass beyond DOL does not contribute to the reduction of warpage. Therefore, a realistic upper limit of x equals to DOL. Specifically, it is preferred that x is 40 or less. In the case where x is 40 or less, warpage of a glass due to chemical strengthening can be efficiently reduced.

(c) of FIG. 1 is an enlarged view of a dotted line part of the graph of (b) of FIG. 1. For example, in the case where $\Delta x$ is set to 0.1 in (c) of FIG. 1, the maximum depth x (μm) where the gradient represented by the Formula (a) is −0.015 is 6.5.

It is preferred in the glass sheet obtained by the present invention that the amount of fluorine contained in the glass is more than 0.23 mol %·μm and 21 mol %·μm or less on a depth direction profile by a secondary ion mass spectrometry (SIMS) in which a horizontal axis represents a depth as a glass surface being zero and a vertical axis represents a fluorine concentration (mol %).

Figure 3:
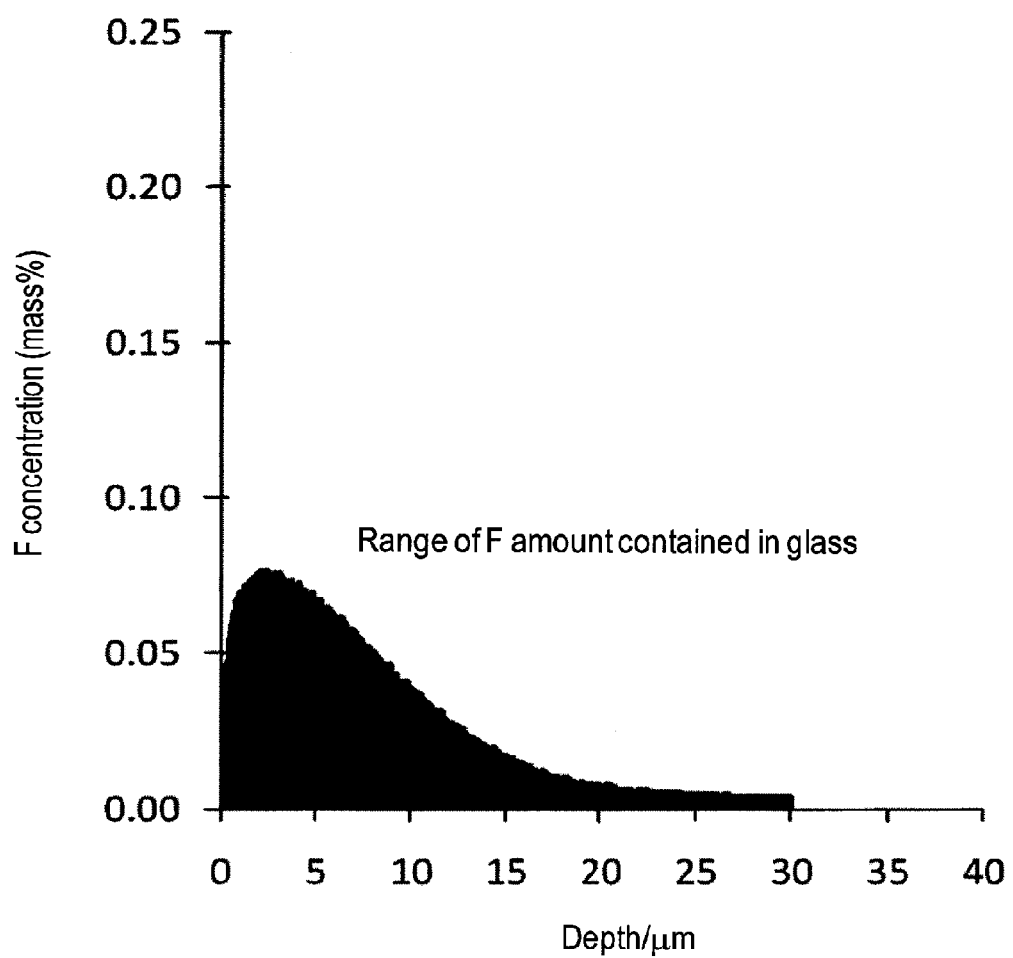
FIG. 3 is a view illustrating a method for calculating the amount of F contained in a glass from SIMS profile.

The amount of fluorine contained in the glass can be obtained by integration (mol %·μm) on a depth direction profile by SIMS in which a horizontal axis represents a depth (μm) as a glass surface being zero and a vertical axis represents a fluorine concentration (mol %), as shown in FIG. 3. Calculation method of a fluorine concentration in SIMS is described hereinafter.

Exactly, the amount of fluorine contained in a glass indicates an amount of a fluorine atom contained in the entire glass sheet, but it is considered that there is a limit in a depth that fluorine can penetrate into a glass by a fluorine treatment. Therefore, it can be actually considered to be the same value as an integrated value when measuring a depth direction profile at a depth from a glass surface of from 0 to 30 µm.

Figure 4:
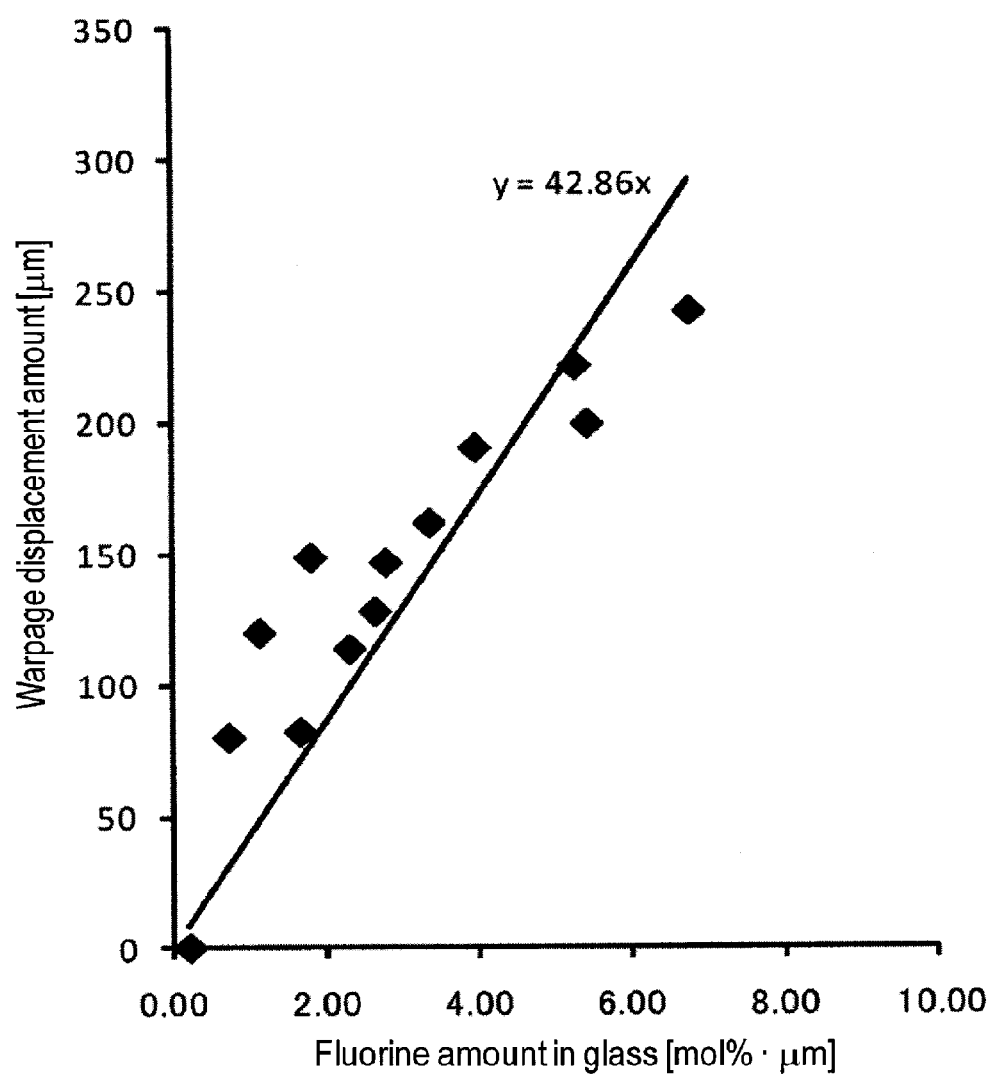
FIG. 4 is a view showing the relationship between the amount of fluorine, obtained from SIMS, contained in a glass of the glass sheet (aluminosilicate glass) according to the present invention and the warpage displacement amount after chemically strengthening the glass.
Figure 5:
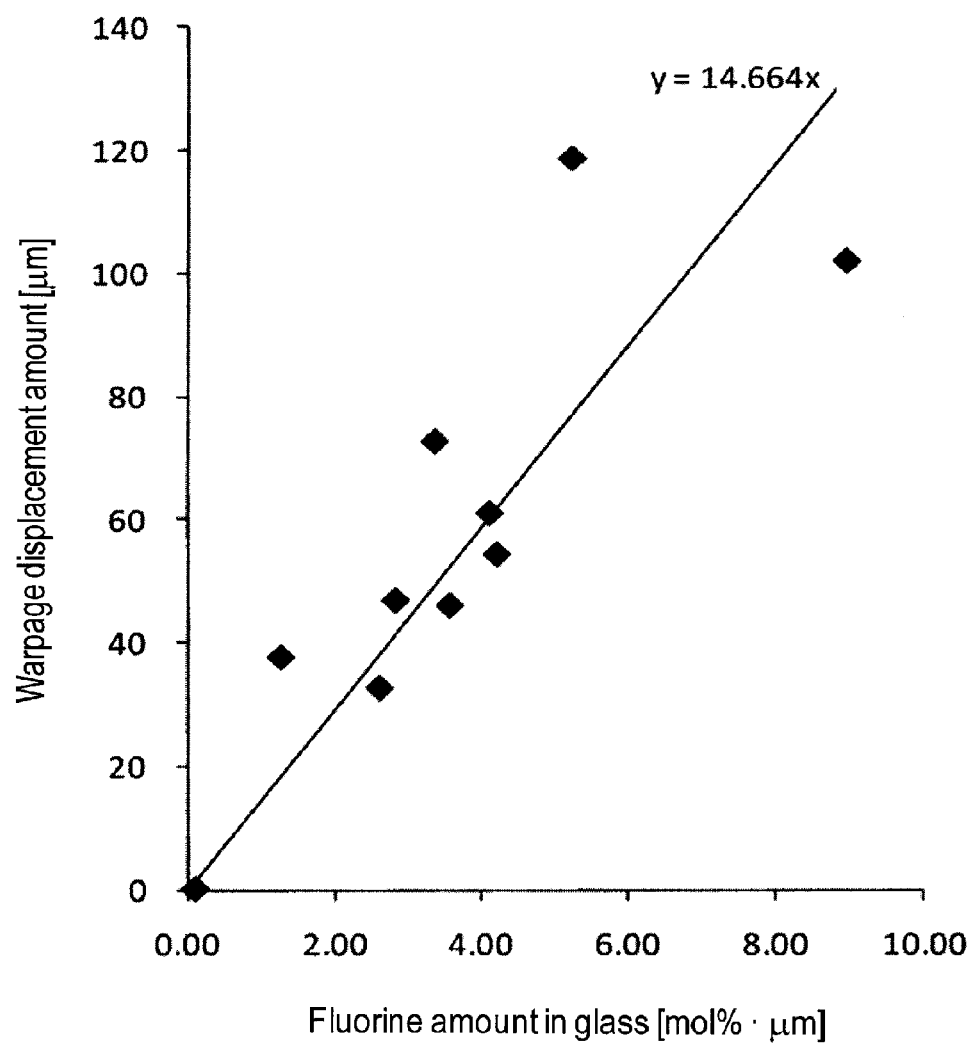
FIG. 5 is a view showing the relationship between the amount of fluorine, obtained from SIMS, contained in a glass of the glass sheet (soda lime silicate glass) according to the present invention and the warpage displacement amount after chemically strengthening the glass.

It is considered that the amount (mol %·µm) of fluorine contained in a glass and the warpage displacement amount (µm) after chemical strengthening of the glass have primary proportional relationship (FIG. 4 and FIG. 5). The warpage displacement amount is obtained by the following formula.

Warpage displacement amount=$\Delta X - \Delta Y$ $\Delta X$: Warpage change amount of untreated glass sheet due to chemical strengthening $\Delta Y$: Warpage change amount of treated glass sheet due to chemical strengthening The warpage change amount is a value obtained by subtracting the warpage amount of a glass sheet before chemical strengthening from the warpage amount of the glass sheet after chemical strengthening. The warpage change amount is $\Delta X>0$. $\Delta Y$ is $\Delta Y>0$ in the case of warping in the same direction as $\Delta X$ and is $\Delta Y<0$ in the case of warping in a direction opposite to $\Delta X$.

When the amount of fluorine contained in a glass falls within the above range, warpage due to chemical strengthening can be improved regardless of the kind of the glass. Above all, a glass produced by a float process is preferred because further improvement effect of warpage is observed therein. The amount of fluorine contained in a glass is preferably more than 0.23 mol %·µm and more preferably 0.7 mol %·µm or more. In the case where the amount of fluorine contained in a glass is 0.23 mol %·µm or less, significant difference cannot be observed in the displacement of warpage. It is practically preferred that the amount of fluorine contained in a glass is 21 mol %·µm or less or 9 mol %·µm or less.

The glass sheet obtained by the present invention is that even in the case of the glass sheet after chemical strengthening, the amount of fluorine contained in the glass is more than 0.23 mol %·µm and 21 mol %·µm or less on a depth direction profile by secondary ion mass spectrometry (SIMS) in which a horizontal axis represents a depth (µm) and a vertical axis represents a fluorine concentration (mol %).

The glass sheet obtained by the present invention may contain fluorine in both surfaces thereof and may contain fluorine in only one surface thereof. Above all, the latter is preferred from the standpoint of improvement in warpage.

In the present description, one surface and the other surface of a glass sheet mean one surface and the other surface that face to each other in a sheet thickness direction, respectively. Both surfaces of a glass sheet mean both surfaces facing in a sheet thickness direction.

A method for obtaining a fluorine concentration (mol %) in secondary ion mass spectrometry (SIMS) is described below. The fluorine concentration can be obtained by the above-described procedures. An integrated value in the case where the fluorine concentration (mol %) is on a vertical axis and a depth (µm) is on a horizontal axis is defined as an amount (mol %·µm) of fluorine contained in the glass.

The thickness of the glass sheet is not particularly limited, and may be, for example, 2 mm, 0.8 mm, 0.73 mm, 0.7 mm, 0.56 mm, and 0.4 mm. To effectively perform a chemical strengthening treatment described hereinafter, it is usually preferably 5 mm or less, more preferably 3 mm or less, still more preferably 1.5 mm or less, and particularly preferably 0.8 mm or less.

Usually, the warpage amount after chemical strengthening of a glass sheet having a thickness of 0.7 mm is required to be 40 µM or less. In the case of a 90 mm square glass sheet having CS of 750 MPa and DOL of 40 µm, the warpage amount after chemical strengthening is about 130 µm. On the other hand, the warpage amount of a glass sheet after chemical strengthening has the relationship in reverse proportion to the square of a sheet thickness. Therefore, the warpage amount when the thickness of the glass sheet is 2.0 mm is about 16 µm, and the warpage does not substantially become a problem. Therefore, there is a possibility that the problem of warpage after chemical strengthening arises in a glass sheet having a thickness of less than 2 mm, typically, 1.5 mm or less.

2. Method for Manufacturing Glass Sheet

The method for manufacturing a float glass according to the present invention is a method for manufacturing a float glass, including a step of melting a glass raw material, a step of forming the glass melted in the melting step into a glass ribbon while floating the glass on a molten metal, and a step of annealing the glass ribbon, in which in the forming step, a gas or liquid containing a molecule having a fluorine atom present therein is blown to the glass ribbon having a viscosity of from $1.0 \times 10^4$ to $2.5 \times 10^{10}$ Pa·s.

As the glass, use can be made of those having various compositions so long as those have compositions capable of being strengthened by a chemical strengthening treatment. For example, they are manufactured in a manner that an appropriate amounts of various raw materials are blended, heated and melted, thereafter homogenized by defoaming or stirring, formed into a sheet shape by a conventional float process, annealed, then cut into a desired size, and polished. The glass manufactured by a float process in the present invention is preferred because improvement in warpage after chemical strengthening is easily exhibited as compared with a glass obtained by other method such as a downdraw process or a pressing process.

Specific examples of the glass sheet used in the present invention typically include glass sheets formed of a soda lime silicate glass, an aluminosilicate glass, a borate glass, a lithium aluminosilicate glass, or a borosilicate glass.

Of those, a glass having a composition containing Al is preferred. In the case where an alkali is co-present, Al takes tetracoordination and participates in the formation of a mesh to become a network of the glass similar to Si. In the case where Al of tetracoordination is increased, migration of an alkali ion becomes easy, and therefore ion-exchange becomes easy to proceed during chemical strengthening.

Example of the composition of the glass sheet of the present invention includes a glass containing, as the composition in terms of mol %, from 50 to 80% of $SiO_2$, from 0.1 to 25% of $Al_2O_3$, from 3 to 30% of $Li_2O+Na_2O+K_2O$, from 0 to 25% of MgO, from 0 to 25% of CaO, and from 0 to 5% of $ZrO_2$, but the composition is not particularly limited. More specifically, the following composition of a glass is exemplified. For example, the expression "containing from 0 to 25% of MgO" means that MgO is not essential, but may be contained up to 25%. The glass of (i) is included in a soda lime silicate glass, and the following glasses of (ii) and (iii) are included in an aluminosilicate glass.

(i) A glass containing, as the composition in terms of mol %, from 63 to 73% of $SiO_2$, from 0.1 to 5.2% of $Al_2O_3$, from 10 to 16% of $Na_2O$, from 0 to 1.5% of $K_2O$, from 5 to 13% of MgO, and from 4 to 10% of CaO (ii) A glass containing, as the composition in terms of mol %, from 50 to 74% of $SiO_2$, from 1 to 10% of $Al_2O_3$, from 6 to 14% of $Na_2O$, from 3 to 11% of $K_2O$, from 2 to 15% of MgO, from 0 to 6% of CaO, and from 0 to 5% of $ZrO_2$, provided that the total content of $SiO_2$ and $Al_2O_3$ is 75% or less, the total content of $Na_2O$ and $K_2O$ is from 12 to 25%, and the total content of MgO and CaO is from 7 to 15%

(iii) A glass containing, as the composition in terms of mol %, from 68 to 80% of $SiO_2$, from 4 to 10% of $Al_2O_3$, from 5 to 15% of $Na_2O$, from 0 to 1% of $K_2O$, from 4 to 15% of MgO, and from 0 to 1% of $ZrO_2$ (iv) A glass containing, as the composition in terms of mol %, from 67 to 75% of $SiO_2$, from 0 to 4% of $Al_2O_3$, from 7 to 15% of $Na_2O$, from 1 to 9% of $K_2O$, from 6 to 14% of MgO, and from 0 to 1.5% of $ZrO_2$, provided that the total content of $SiO_2$ and $Al_2O_3$ is from 71 to 75%, the total content of $Na_2O$ and $K_2O$ is from 12 to 20%, and the content of CaO if contained is less than 1%

In the method for manufacturing a glass sheet of the present invention, a gas or liquid containing a molecule having a fluorine atom present in its structure (hereinafter referred to as a "fluorine-containing fluid") is brought into contact with at least one surface of a glass ribbon to perform a surface treatment. In the case where the fluorine-containing fluid is brought into contact with at least one surface of a glass ribbon to perform a surface treatment, a viscosity of the glass ribbon is preferably from $1.0 \times 10^4$ to $2.5 \times 10^{10}$ Pa·s, and more preferably from $1.5 \times 10^4$ to $9.8 \times 10^7$ Pa·s. In the case of $2.0 \times 10^{10}$ Pa·s or less, warpage of the glass after chemical strengthening can be effectively suppressed. Furthermore, in the case of from $1.5 \times 10^4$ to $5.0 \times 10^5$ Pa·s, the effects of the following (1) to (3) are remarkable, and therefore this is more preferred.

(1) Warpage due to chemical strengthening of a glass is generated by a difference in compressive stress between both surfaces of the glass. In a glass sheet produced by a float process, composition distribution in a depth direction generally differs between the front surface and the back surface thereof. For this reason, the degree of compressive stress due to chemical strengthening in a depth direction also differs between the front surface and the back surface of the glass, and as a result, warpage occurs in the glass. The warpage depends on a thickness of a compressive stress layer (hereinafter referred to as "DOL").

On the other hand, it has been found by the investigation results by the present inventors that fluorine in glass has an effect of relaxing compressive stress given by chemical strengthening. Therefore, the difference in compressive stress of the front and back surfaces of a glass as described above can be decreased by introducing fluorine in the glass surface, to thereby diminish the warpage. In this case, of the compressive stress given to a depth of DOL, stress relaxation occurs in a region up to a fluorine penetration depth. For this reason, in the case where the fluorine penetration depth is large, when DOL has fluctuated, fluctuation of a proportion of the fluorine penetration depth to the compressive stress depth becomes small, and therefore, fluctuation of stress relaxation becomes small. As a result, fluctuation of the amount of warpage improvement also becomes small.

For the above reason, a penetration depth of fluorine into a glass is increased by setting the viscosity of the glass ribbon to $9.8 \times 10^7$ Pa·s or less and particularly $5.0 \times 10^5$ Pa·s or less, thereby decreasing a fluorine concentration on the outermost surface in the glass, and DOL dependency of warpage of the glass due to chemical strengthening can be suppressed.

(2) In the case where a glass is subjected to a fluorine treatment and then the glass is subjected to polishing or an etching treatment, fluorine on the glass surface is decreased, and warpage reduction effect after chemical strengthening by the fluorine treatment of the glass is decreased. By setting a viscosity of the glass ribbon to $9.8 \times 10^7$ Pa·s or less and particularly $5.0 \times 10^5$ Pa·s or less, and by increasing a penetration depth of fluorine into the glass, warpage reduction effect of the glass after chemical strengthening by the fluorine treatment can be sufficiently assured even in the case of subjecting the glass to polishing or an etching treatment before chemical strengthening.

(3) In the case where the fluorine concentration on the outermost surface is increased by subjecting one surface of a glass to a fluorine treatment, stress of only one surface is relaxed by fluorine, and there is a problem that CS is difficult to be given. By setting a viscosity of the glass ribbon to $9.8 \times 10^7$ Pa·s or less and particularly $5.0 \times 10^5$ Pa·s or less, a fluorine concentration on the outermost surface is prevented from increasing, and it becomes possible to reduce $\Delta CS$ (the difference between CS value on a top surface and CS value on a bottom surface) close to 0. As a result, a glass not only achieving the reduction in warpage due to chemical strengthening but also excellent in point of strength can be obtained.

From the standpoints of a fluorine penetration depth and a fluorine concentration in view of the above, lower viscosity of the glass ribbon is preferred. However, where the viscosity of the glass ribbon is too low, the time from penetration of fluorine until the formation of a float glass by annealing the glass ribbon becomes long. Therefore, on the contrary, fluorine penetrating in the glass escapes therefrom, and as a result, the amount of fluorine penetrating into the float glass is decreased in some cases. Furthermore, where the viscosity at fluorine penetration is too low, the glass ribbon is in a state having an extremely large thickness. Where fluorine is allowed to penetrate into the glass ribbon in the state having such the large thickness, when the glass ribbon is thereafter molded while thinly spreading to obtain a float glass, the fluorine concentration per unit volume of the float glass is thereby decreased, and the fluorine penetration depth becomes also small.

In view of the above, it is preferred that the lower limit of the viscosity of the glass ribbon when fluorine is allowed to penetrate is $1.5 \times 10^4$ Pa·s.

The temperature and viscosity of a glass sheet have correlation, but the correlation varies depending on the composition of a glass.

In the case where the viscosity of a glass ribbon is controlled to $9.8 \times 10^7$ or less, a fluorine-blowing treatment becomes easy to perform with a sufficient total contact amount of fluorine to reduce the warpage amount of the glass after chemical strengthening while maintaining satisfactory surface smoothness of the glass ribbon. The term "glass sheet" is hereinafter sometimes used to collectively call a glass sheet and a glass ribbon.

Examples of the fluorine-containing fluid include hydrogen fluoride (HF), Freon (for example, chlorofluorocarbon, fluorocarbon, hydrochlorofluorocarbon, hydrofluorocarbon, or halon), hydrofluoric acid, fluorine simple substance, trifluoroacetic acid, carbon tetrafluoride, silicon tetrafluoride, phosphorus hexafluoride, phosphorus trifluoride, boron trifluoride, nitrogen trifluoride, and chlorine trifluoride. However, it is not limited to those fluids.

Of those, hydrogen fluoride, Freon and hydrofluoric acid are preferred from the standpoint of high reactivity with the glass sheet surface. Of those gases, two or more kinds may be used as a mixture. Where a fluorine-containing fluid is blown to a glass ribbon in producing a glass by a float process, it is preferred that fluorine simple substance is not used in a float bath since oxidation power is too strong.

In the case of using a liquid, the liquid may be directly supplied to a glass sheet surface by, for example, spray coating, or the liquid may be gasified and then supplied to the glass sheet surface. As necessary, the liquid may be diluted with another fluid.

The fluorine-containing fluid may contain a fluid other than the above-described fluids. Preferred is a fluid that does not react at ordinary temperatures with a molecule having a fluorine atom present therein.

Examples of the other fluid include $N_2$, air, $H_2$, $O_2$, Ne, Xe, $CO_2$, Ar, He, and Kr, but it is not limited to those. Of those gases, two or more kinds can be used as a mixture.

As a carrier gas of the gas containing a molecule having a fluorine atom present in its structure, it is preferred to use an inert gas such as $N_2$ or argon. Furthermore, the gas containing a molecule having a fluorine atom present in its structure may further contain $SO_2$. $SO_2$ is used in continuously manufacturing a glass sheet by a float process or the like, and has an action to prevent the generation of defects in the glass by the contact of transfer rolls with the glass sheet in an annealing zone. Furthermore, a gas that decomposes at high temperature may be contained.

The gas or liquid containing a molecule having a fluorine atom present in its structure may further contain water vapor or water. The water vapor can be taken out by making an inert gas such as nitrogen, helium, argon, or carbon dioxide bubble in water heated. In the case where a large amount of water vapor is required, a method of sending water to a vaporizer and directly vaporizing it can be employed.

By blowing the fluorine-containing fluid to a glass or a glass ribbon, fluorine is allowed to penetrate from the glass surface, and a glass containing fluorine can be obtained.

In the case of blowing the fluorine-containing fluid to a glass ribbon to allow fluorine to penetrate therein in a float process, it is preferred from the standpoint of load reduction to facilities that a fluorine atom concentration in the fluorine-containing fluid is from 0.1 vol % to 15 vol %.

In the float process in the present invention, a glass sheet is manufactured by using a glass manufacturing apparatus having a melting furnace (including clarifying bath) in which a glass raw material is melted, a float bath in which a glass ribbon is formed by floating a molten glass on a molten metal (such as tin), and an annealing furnace in which the glass ribbon is annealed. In an annealing region subsequent to a molten metal (tin) bath, the glass sheet is transferred by roller transfer. The annealing region used herein includes not only the inside of the annealing furnace, but the region in which the glass ribbon is transferred from the molten metal (tin) bath in the float bath and transferred in the annealing furnace.

A schematically explanatory view of a method of, in the manufacturing of a glass sheet by a float process, blowing a gas containing a molecule having a fluorine atom in its structure (hereinafter referred to as a "fluorine-containing gas") to the upper surface of a glass ribbon is illustrated in (a) of FIG. 9.

In a float bath in which a glass ribbon 101 is formed by floating a molten glass on a molten metal (such as tin), a fluorine-containing gas is blown to the glass ribbon 101 by a beam 102 inserted in the float bath. As shown in (a) of FIG. 9, it is preferred that the fluorine-containing gas is blown to the glass ribbon 101 from the side at which the glass ribbon 101 is not brought into contact with the molten metal surface. An arrow Ya indicates a direction to which the glass ribbon 101 flows in the float bath.

The position of blowing the fluorine-containing gas to the glass ribbon 101 by the beam 102 is preferably a position at which the viscosity of the glass ribbon 101 is from $1.0 \times 10^4$ to $2.5 \times 10^{10}$ Pa·s, and more preferably a position of from $1.5 \times 10^4$ to $9.8 \times 10^7$ Pa·s. The preferred viscosity of the glass ribbon varies depending on the kind of a gas blown. Basically, the amount of fluorine in the glass obtained can be increased by blowing a fluorine-containing fluid of higher concentration and/or larger amount to the glass ribbon having lower viscosity within the above range.

The position of the beam 102 may be upstream of a radiation gate 103 and may be downstream thereof. The amount of the fluorine-containing fluid blown to the glass ribbon 101 is preferably from $1 \times 10^{-6}$ to $5 \times 10^{-3}$ mol/glass ribbon 1 $cm^2$ in the case of HF.

In the case of allowing a given amount of fluorine penetrate up to a deep position of a glass, it can be achieved by blowing the fluorine-containing fluid of higher concentration and/or larger amount to the glass ribbon having lower viscosity as described above. However, where the fluid is blown at a position of low viscosity, the amount of fluorine reacting with glass raw materials is increased, thereby increasing contamination, resulting in a generation of defects in the glass.

On the other hand, the defects can be reduced by blowing the fluorine-containing fluid at a position of high viscosity, but where the viscosity is high, the fluorine cannot penetrate up to deep position of the glass.

Thus, it can be said that the penetration depth of fluorine and the generation of defects depending on degree of viscosities at which the fluorine-containing fluid is blown have a trade-off relationship.

In view of the above, a glass having large penetration depth of fluorine, that is, large amount of fluorine penetrating, and less defects can be obtained by blowing the fluorine-containing fluid at two or more viscosity regions of high and low with the corresponding certain amounts, and therefore this is preferred.

(b) of FIG. 9 illustrates a cross-sectional view taken along A-A in (a) of FIG. 9. The fluorine-containing fluid blown to the glass ribbon 101 from a direction of Y1 by the beam 102 flows in from "IN" and flows out to the direction of "OUT". Specifically, it moves in directions of arrows Y4 and Y5, and exposes to the glass ribbon 101. The fluorine-containing fluid moved in the direction of the arrow Y4 flows out to the direction of an arrow Y2, and the fluorine-containing fluid moved in the direction of the arrow Y5 flows out to the direction of an arrow Y3.

In some cases, the warpage amount of the glass sheet after chemical strengthening varies depending on the position in a width direction of the glass ribbon. In such a case, it is preferred to adjust the amount of the fluorine-containing fluid. That is, it is preferred that the amount of the fluorine-containing fluid blown is increased at a position at which the warpage amount is large and an amount of the fluorine-containing fluid blown is decreased at a position at which warpage amount is small.

In the case where the warpage amount of the glass sheet after chemical strengthening varies depending on the position in the glass ribbon 101, the warpage amount may be adjusted in a width direction of the glass ribbon 101 by changing the structure of the beam 102 as a structure that can adjust the amount of the fluorine-containing fluid in a width direction of the glass ribbon 101.

As a specific example, a cross-sectional view of a beam 102 that adjusts the amount of the fluorine-containing fluid by dividing into three parts of I to III in a width direction 110 of the glass ribbon 101 is illustrated in (a) of FIG. 10. Gas systems 111 to 113 are divided by partition walls 114 and 115, and the fluorine-containing fluid is made to flow out of the gas blowing holes 116 to be blown to the glass.

The arrows in (a) of FIG. 10 indicate a flow of the fluid. The arrows in (b) of FIG. 10 indicate a flow of the fluid in the gas system 111. The arrows in (c) of FIG. 10 indicate a flow of the fluid in the gas system 112. The arrows in (d) of FIG. 10 indicate a flow of the fluid in the gas system 113.

A method of blowing a fluorine-containing fluid to the upper surface of a glass ribbon includes, for example, a method of using an injector and an introduction tube.

Figure 6:
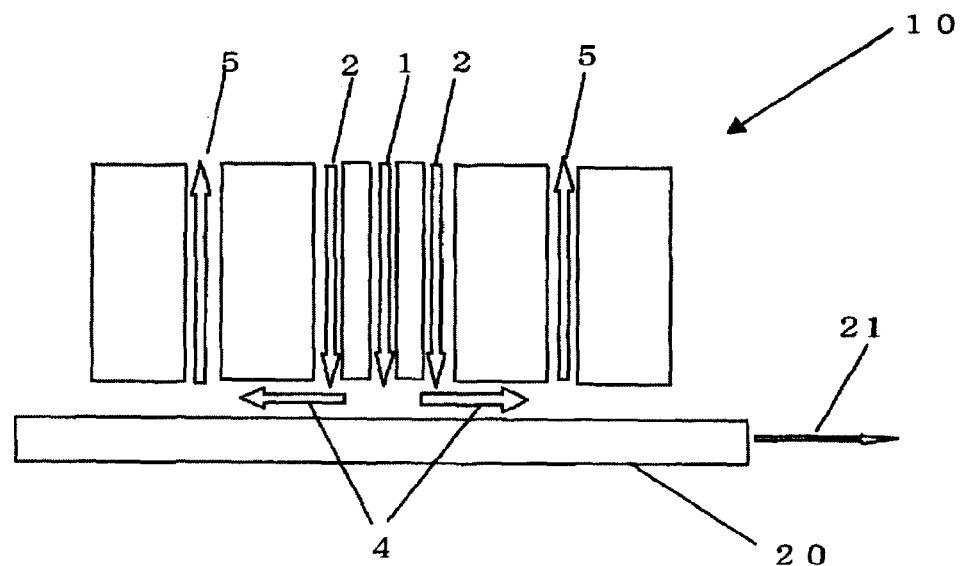
FIG. 6 is a view schematically illustrating a both-side flow type injector that can be used in the present invention.
Figure 7:
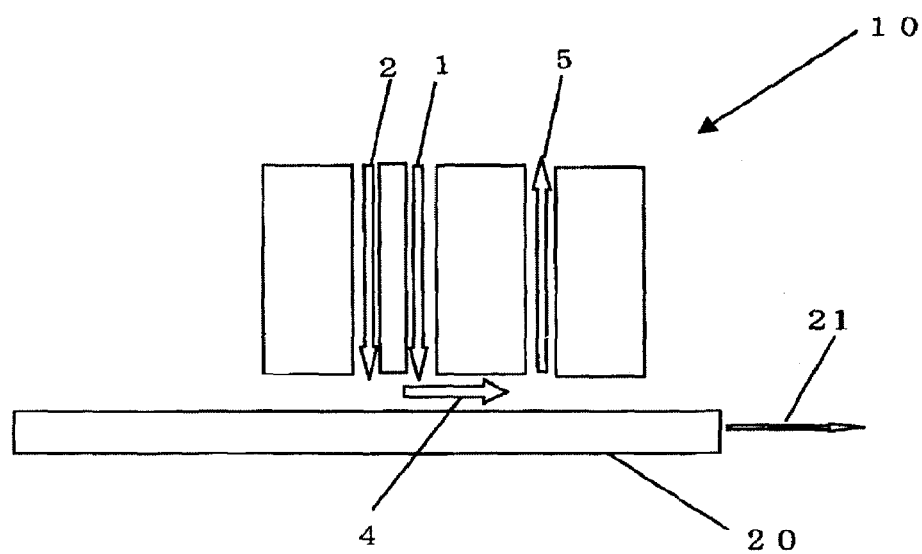
FIG. 7 is a view schematically illustrating a one-side flow type injector that can be used in the present invention.

Schematic views of an injector used in a surface treatment of a glass sheet, which can be used in the present invention are illustrated in FIG. 6 and FIG. 7. FIG. 6 is a view schematically illustrating a both-side flow type injector 10 that can be used in the present invention. FIG. 7 is a view schematically illustrating a one-side flow type injector 10 that can be used in the present invention.

The fluorine-containing fluid is ejected toward a glass sheet 20 from a central slit 1 and an outer slit 2, flows on the glass sheet 20 through a flow passage 4, and is evacuated from an evacuation slit 5. Reference numeral 21 in FIG. 6 and FIG. 7 is a direction to which the glass sheet 20 flows, and is parallel to the flow passage 4.

In the case where the fluorine-containing fluid supplied from the injector is a gas, a distance between a gas ejection port of the injector and the glass sheet is preferably 50 mm or less.

In the case where the distance is 50 mm or less, the gas can be suppressed from diffusing in air, and a sufficient amount of the gas relative to the desired amount of the gas can be made to reach to the glass sheet. On the other hand, where the distance to the glass sheet is too short, there is a concern that, for example, the glass sheet comes into contact with the injector due to fluctuation of the glass ribbon in treating in an on-line system the glass sheet manufactured by a float process.

In the case where the fluorine-containing fluid supplied from the injector is a liquid, there is no particular limitation in the distance between a liquid ejection port of the injector and the glass sheet, and an arrangement such that the glass sheet can be uniformly treated may be employed.

The injector may be used in any embodiment such as both-side flow type or one-side flow type. Two or more injectors may be arranged in series in a flow direction of a glass sheet to treat the glass sheet surface. The both-side flow type injector is an injector in which a flow of a gas of from ejection to evacuation is equally divided into a forward direction and a backward direction relative to a movement direction of a glass sheet as illustrated in FIG. 6.

The both-side flow type injector is a general one, and is also known as the one used to manufacture a low reflection glass. For example, it is used in some cases such that, to a soda lime silicate glass (glass transition point: 560° C.) manufactured by Asahi Glass Co., Ltd., having a thickness of 1.8 mm and reheated to 600° C., a gas obtained by mixing an HF gas in 1.12 SLM (liter per minute as a gas in standard condition) with a nitrogen ($N_2$) gas in 9 SLM is heated to 150° C. and is blown in flow rate of 64 cm/s from the central slit 1 and $N_2$ gas in 45.5 SLM is blown from the outer slit 2. The glass surface to which HF gas has been thus blown has a surface roughness (arithmetic average roughness) Ra of 30.6 nm, and the value of the above-described x of 2.5 µm.

The one-side flow type injector is an injector in which a flow of a gas from ejection to evacuation is fixed to either of a forward direction or a backward direction relative to a movement direction of a glass sheet as illustrated in FIG. 7. In the case where the one-flow type injector is used, it is preferred from the standpoint of air stream stability that a flow of a gas on a glass sheet and a movement direction of the glass sheet is the same.

It is preferred that a supply port of the fluorine-containing fluid is present on the surface at the same side of a glass sheet with an evacuation port of an unreacted fluorine-containing fluid, a gas formed by a reaction with the glass sheet and a gas formed by a reaction of two or more kinds of gases of the fluorine-containing fluid.

To obtain an improvement effect of warpage after chemical strengthening while maintaining satisfactory surface smoothness of the upper surface of a glass ribbon, it is preferred that the viscosity of the glass ribbon when the fluorine-containing fluid is blown thereto is $9.8 \times 10^7$ Pa·s or less as described before. In the present description, the surface smoothness can be evaluated by, for example, surface roughness (arithmetic average roughness) Ra and the presence or absence of a concave part obtained by the observation with an atomic force microscope (AFM) or a scanning electron microscope (SEM). The concave part means a fine hole generated on the surface of a glass sheet, which can be visually observed with SEM. In the case where the concave part is generated on a glass sheet, strength of the glass sheet is deteriorated.

The concave part typically has a shape of reducing its diameter in a depth direction from the surface and then expanding in a nearly spherical bag shape. The diameter of such a concave part indicates a diameter of the narrow part between the diameter reduction part and the bag-shaped part, and can be observed with SEM or the like. The depth of the concave part indicates a depth of from the glass surface to the deepest part of the bag-shaped part, and can be measured by cross-sectional SEM observation or the like.

The concave part in the present invention is one having a size of 10 nm or more and generally 20 nm or more, and typically, the diameter is 40 nm or less. The depth of the concave part is measured by, for example, SEM observation of a cross-section. The depth is generally 10 nm or more and typically 150 nm or less.

Where the concave parts are present in a density of more than 741 m² on the top surface of the glass obtained, strength of the chemically strengthened glass sheet may be deteriorated. Therefore, even if the concave parts are present, its density is preferably 6/µm² or less, more preferably 4/µm² or less and most preferably 0/µm². Average interval of the concave parts where the density of concave parts is 6/µm² is 460 nm.

The concave part is described below by reference to the case that a fluorine treatment is carried out to an aluminosilicate glass by using an HF gas as a fluorine-containing fluid. When the presence or absence of the concave part is plotted relative to HF total contact amount (mol/cm²) and HF treatment temperature (° C.), it indicates a correlation as in the graph shown in FIG. 11. In FIG. 11, non-generation of concave part is plotted by ○, and the generation of concave part is plotted by X.

It is considered that the concave part is not generated by HF treatment in the case where the HF total contact amount and HF treatment temperature satisfy the following Formula (α). That is, it is considered that in the case where (1) the treatment temperature is low (volatilization rate of a fluoride is small) and (2) the HF total contact amount is large (formation rate of a fluoride is large), concave part is likely to be generated.

$$Y > 81 \ln X + 1500 \quad \text{Formula } (\alpha)$$

In the Formula (α), Y represents HF treatment temperature (° C.), X represents HF total contact amount (mol/cm$^2$), and X is obtained by the following Formula (β).

[HF total contact amount (mol/cm$^2$)]=[HF gas concentration (vol %)]×[gas flow rate (mol/s/cm$^2$)]×[treatment time (s)]   Formula (β)

Explanatory view of mechanism of the generation of concave part by HF treatment is illustrated in (a) to (d) of FIG. 12. It is considered that formation and volatilization of a fluoride occur by subjecting a glass to HF treatment [(a) of FIG. 12], and in the case where formation rate of the fluoride by the reaction between HF and the glass is larger than volatilization rate of the fluoride formed, the fluoride formed remains on the treated surface [(b) of FIG. 12], the molten fluoride undergoes crystal growth while etching and additionally, a molten salt is decreased [(c) of FIG. 12] and as a result, a final product is observed as a concave part [(d) of FIG. 12].

When supplying a gas or liquid containing a molecule having a fluorine atom present in its structure to a glass sheet surface, the pressure of the glass sheet surface is preferably an atmosphere in a pressure range of from (atmospheric pressure−100) Pa to (atmospheric pressure+100) Pa, and more preferably an atmosphere in a pressure range of from (atmospheric pressure−50) Pa to (atmospheric pressure+50) Pa.

Gas flow rate is representatively described in the case of using HF gas as the fluorine-containing fluid. In treating a glass sheet with HF gas, warpage improvement effect in chemical strengthening is large with increasing the HF gas flow rate, and this is preferred. In the case where the total gas flow rate is the same, the warpage improvement effect in the chemical strengthening is increased with increasing HF concentration.

In the case where the total gas flow rate and the HF gas flow rate are constant, the warpage improvement effect in chemical strengthening is increased with prolonging the time for treating a glass sheet. For example, in the case where the glass sheet is heat-treated and the glass sheet surface is then treated with HF gas, warpage after chemical strengthening is improved with decreasing a transfer rate of the glass sheet. Even in facilities in which the total gas flow rate and HF gas flow rate cannot be controlled satisfactorily, warpage after chemical strengthening can be improved by appropriately controlling transfer rate of the glass sheet.

3. Chemical Strengthening

Chemical strengthening is a treatment of forming a compressive stress layer on a glass surface by exchanging an alkali metal ion (typically, Li ion or Na ion) having small ionic radius on the glass surface with an alkali metal ion (typically, K ion) having larger ionic radius by ion exchange at a temperature equal to or lower than a glass transition point. The chemical strengthening treatment can be conducted by a conventional method.

Glass sheet in which warpage after chemical strengthening is improved can be obtained by chemically strengthening the glass obtained by the manufacturing method according to the present invention. Change amount of warpage (warpage change amount) of the glass sheet after chemical strengthening to the glass sheet before chemical strengthening can be measured by a three-dimensional contour measuring instrument (for example, manufactured by Mitaka Kohki Co., Ltd.) or a surface texture and contour measuring instrument (for example, manufactured by Tokyo Seimitsu Co., Ltd.).

In the present invention, the improvement of warpage after chemical strengthening is evaluated by warpage displacement amount obtained by the following formula in the experiments conducted under the same conditions except that surface treatment is conducted by using a fluorine-containing fluid.

Warpage displacement amount=$\Delta X - \Delta Y$ $\Delta X$: Warpage change amount of untreated glass sheet due to chemical strengthening $\Delta Y$: Warpage change amount of treated glass sheet due to chemical strengthening The warpage change amount is a value obtained by subtracting the warpage amount of a glass sheet before chemical strengthening from the warpage amount of the glass sheet after chemical strengthening. The warpage change amount is $\Delta X > 0$. $\Delta X$ is $\Delta Y > 0$ in the case of warping in the same direction as $\Delta X$ and is $\Delta Y < 0$ in the case of warping in a direction opposite to $\Delta X$.

The warpage change amount of an untreated glass sheet due to chemical strengthening depends on various conditions, and has large variation. Warpage displacement amount larger than a predetermined value means that warpage can be controlled regardless of the variation. Therefore, the glass sheet having a predetermined value of warpage displacement amount, specifically 10 μm or more, can reduce the problem of warpage.

CS (surface compressive stress) and DOL (depth of compressive stress layer) of a glass sheet can be measured by a surface stress meter. In the chemically strengthened glass, the surface compressive stress is preferably 600 MPa or more, and the depth of the compressive stress layer is preferably 15 μm or more. Excellent strength and scratch resistance can be obtained by setting the surface compressive stress and the depth of the compressive stress layer of the chemically strengthened glass to the ranges described above.

4. Flat Panel Display Device

Figure 8:
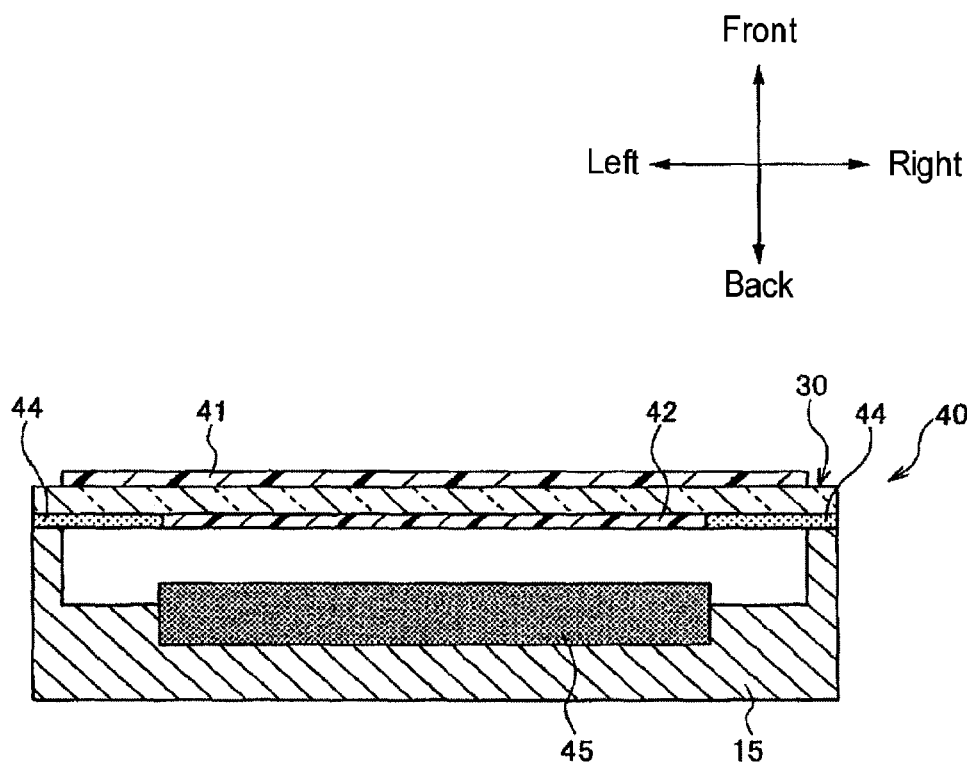
FIG. 8 is a cross-sectional view of a flat panel display in which the float glass for chemical strengthening of the present invention which has been chemically strengthened is used as a cover glass for the flat panel display.

An example of using a chemically strengthened glass as a cover glass of a flat panel display device after chemically strengthening the glass sheet of the present invention is described below. FIG. 8 is a cross-sectional view of a display device having a cover glass arranged thereon. In the following description, front/back and left/right are based on the direction of the arrow in the drawing.

A display device 40 is equipped with a display panel 45 provided in a housing 15, and a cover glass 30 arranged so as to cover the entire surface of the display panel 45 and surround a front part of the housing 15, as illustrated in FIG. 8.

The cover glass 30 is mainly arranged for the purpose of the improvement of beauty and strength and the prevention of impact damage of the display device 40, and is formed from one plate-shaped glass having the entire shape of a nearly flat shape. The cover glass 30 may be arranged so as to have a distance from a display side (front side) of the display panel 45 (so as to have an air layer) as illustrated in FIG. 8, or may be stuck to the display side of the display panel 45 with an adhesive film (not illustrated) having translucency.

As for the cover glass 30, on the front face thereof, from which emits light from the display panel 45, a functional film 41 is provided, and on the back face thereof, into which light from the display panel 45 enters, a functional film 42 is provided at a position corresponding to the display panel 45. The functional films 41 and 42 are provided on both faces in FIG. 8, but the invention is not limited to this embodiment, and they may be provided on a front face or a back face, or may be omitted.

The functional films 41 and 42 have functions such as, for example, antireflection of ambient light, impact damage prevention, electromagnetic wave shielding, near infrared light shielding, tone correction, and/or scratch resistance improvement, and its thickness, shape and the like are appropriately selected depending on the purpose of use. The functional films 41 and 42 are formed by, for example, sticking a film made of a resin to the cover glass 30. Alternatively, they may be formed by a thin film formation method such as a vapor deposition method, a sputtering method or a CVD method.

Reference numeral 44 is a black layer, and is, for example, a coating film formed by applying an ink containing pigment particles to the cover glass 30, followed by irradiating with ultraviolet rays or heating and firing, and cooling thereafter. By this, display panel and the like are cannot be seen from the outside of the housing 15, and therefore, aesthetic property of the external appearance can be improved.

Thus, in the case of using the glass sheet of the present invention as a cover glass of a display device, surface roughness (arithmetic average roughness) Ra is preferably 2.5 nm or less and more preferably 1.5 nm or less. This can prevent sharpness of a display image of a display device from impairing due to a cover glass. The surface roughness Ra of a glass sheet can be measured as follows according to JIS B0601 (2001). Three places is measured in a scan size of 1 μm×1 μm by using AFM (Atomic Force Microscope), for example, XE-HDM manufactured by Park Systems as a measurement instrument, and an average value of the three places is defined as Ra value of a glass sheet.

EXAMPLES

Examples of the present invention are specifically described below, but the present invention should not be construed as being limited to those.
(Composition of Glass Sheet)
In the present Examples, a glass sheet of glass material A having the following composition was used.
(Glass material A) Glass containing, in terms of mol %, $SiO_2$: 64.3%, $Al_2O_3$: 8.0%, $Na_2O$: 12.5%, $K_2O$: 4.0%, MgO: 10.5%, CaO: 0.1%, SrO: 0.1%, BaO: 0.1%, and $ZrO_2$: 0.5% (glass transition temperature: 604° C.)
(Measurement of Warpage Amount)
The warpage amount was measured with SURFCOM surface texture and contour measuring instrument (manufactured by Tokyo Seimitsu Co., Ltd.) before chemical strengthening, and then each glass was chemically strengthened and the warpage amount after chemical strengthening was similarly measured. The warpage displacement amount was calculated based on the procedures described above.
(Secondary Ion Mass Spectrometry: SIMS)
Analysis conditions of secondary ion mass spectrometry were as follows.

Measurement instrument: ADEPT 1010 manufactured by ULVAC-PHI, Incorporated
Primary ion species: $Cs^+$
Primary accelerated voltage: 5.0 kV
Primary ion current: 1 μA
Primary ion incident angle (angle from a vertical direction to a sample surface): 60°
Raster size: 200×200 $μm^2$
Detection area: 40×40 $μm^2$
Secondary ion polarity: Minus
Use of electron gun for neutralization: Yes The depth on a horizontal axis of a depth direction profile obtained by SIMS analysis was obtained by measuring the depth of an analysis crater with a stylus type thickness meter (Dektak 150 manufactured by Veeco).
(Presence or Absence of Concave Part)
The HF treated surface of the glass was observed with SEM, and in the case where at least one concave part was observed in an observation field (magnifications: 50,000 to 200,000), it was defined that a concave part is present.
(HF Total Contact Amount)
The HF total contact amount (mol/$cm^2$) was obtained by the following Formula (β). The treatment time in the formula is the time during which HF gas is in contact with the surface of the glass ribbon.

$$[\text{HF total contact amount (mol/cm}^2)] = [\text{HF gas concentration (vol \%)}]/100 \times [\text{gas flow rate (mol/s/cm}^2)] \times [\text{treatment time (s)}] \quad \text{Formula (β)}$$

(Measurement of Surface Compressive Stress: CS and Compressive Stress Depth: DOL)
CS and DOL in the glass sheet obtained after chemical strengthening were measured by using a surface stress meter (FSM-6000LE) manufactured by Orihara Industrial Co., Ltd.

Example 1

In a float bath in which a glass ribbon of glass material A flows, HF treatment (HF total contact amount: 1.28×$10^{-4}$ mol/$cm^2$) was carried out at the treatment temperature and viscosity shown in Table 1. The glass obtained having a thickness of 0.7 mm was cut into a size of 100 mm square, warpage of two diagonals in the portion corresponding to 90 mm square of the substrate were measured, and its average value was defined as the warpage amount before strengthening.

The glass was then dipped in $KNO_3$ molten salt heated to 450° C. for two hours to perform chemical strengthening. Warpage of two diagonals in the portion corresponding to 90 mm square of the substrate were measured, its average value was defined as the warpage amount after strengthening, and the warpage displacement amount was calculated.

The results are shown in Table 1. Comparative Example 1 is a reference in which HF treatment was not performed.

TABLE 1

| | Process condition | | Results | | | | |
|---|---|---|---|---|---|---|---|
| | Treatment temperature [° C.] | Viscosity Pa · s | Δ Warpage [μm] | Warpage displacement amount [μm] | Amount of fluorine contained in glass [mol % · μm] | Penetration depth of fluorine [μm] | Presence or absence of concave part |
| Comparative Example 1 | — | — | 124.9 | 0.0 | | — | Absent |
| Example 1 | 650 | 2.3E+10 | 101.6 | 23.3 | 0.35 | 0.3 | Present |

TABLE 1-continued

| | Process condition | | Results | | | | |
|---|---|---|---|---|---|---|---|
| | Treatment temperature [° C.] | Viscosity Pa·s | Δ Warpage [μm] | Warpage displacement amount [μm] | Amount of fluorine contained in glass [mol %·μm] | Penetration depth of fluorine [μm] | Presence or absence of concave part |
| Example 2 | 700 | 1.2E+09 | 74.6 | 50.3 | 0.48 | 3.1 | Present |
| Example 3 | 750 | 9.7E+07 | 61.0 | 63.9 | 0.75 | 5.0 | Present |
| Example 4 | 775 | 3.3E+07 | 46.5 | 78.4 | 0.90 | 5.6 | Absent |
| Example 5 | 800 | 1.2E+07 | 38.1 | 86.8 | 1.05 | 6.2 | Absent |
| Example 6 | 850 | 2.0E+06 | −15.4 | 140.3 | 1.56 | 8.8 | Absent |
| Example 7 | 900 | 4.1E+05 | −58.2 | 183.1 | 2.12 | 12.6 | Absent |
| Example 8 | 950 | 1.0E+05 | −127.7 | 252.6 | 2.82 | 22.7 | Absent |
| Example 9 | 1000 | 3.1E+04 | −138.9 | 263.8 | 2.98 | 33.0 | Absent |

As shown in Table 1, it was understood that warpage of the glass obtained that had been chemically strengthened can be improved by blowing HF gas at a position that a viscosity of the glass ribbon is from $3.1 \times 10^4$ Pa·s to $2.3 \times 10^{10}$ Pa·s. Furthermore, it was understood that in Examples 1 to 9 in which the amount of fluorine contained in the glass is larger than 0.23 mol %·μm, the warpage after chemical strengthening is effectively improved. Additionally, it was understood that in Examples 2 to 9 in which the penetration depth of fluorine is 1 μm or more, the warpage after chemical strengthening is further effectively improved.

This application is based on Japanese Patent Application No. 2013-198475 filed on Sep. 25, 2013, the disclosure of which is incorporated herein by reference.

DESCRIPTION OF REFERENCE NUMERALS AND SIGNS

1: Central slit
2: Outer slit
4: Flow passage
5: Evacuation slit
15: Housing
20: Glass sheet
30: Cover glass
40: Display device
41, 42: Functional film
45: Display panel
101: Glass ribbon
102: Beam
103: Radiation gate
110: Width direction of glass ribbon
111, 112, 113: Gas system
114, 115: Partition wall
116: Gas blowing hole

The invention claimed is:

1. A method for manufacturing a float glass, comprising:
melting a glass raw material to obtain melted glass,
forming the melted glass into a glass ribbon while floating the melted glass on a molten metal, and
annealing the glass ribbon,
wherein in the forming, a gas or a liquid comprising hydrogen fluoride is blown to the glass ribbon having a viscosity of from $1.5 \times 10^4$ to $9.8 \times 10^7$ Pa·s, such that a hydrogen fluoride total contact amount, X, and a hydrogen fluoride treatment temperature, Y, satisfy formula (α):

$$Y > 81 \ln X + 1500 \quad \text{(Formula (α))}$$

wherein Y represents the hydrogen fluoride treatment temperature in ° C., X represents the hydrogen fluoride total contact amount in mol/cm², and X is obtained by formula (β):

$$X = \text{(hydrogen fluoride gas concentration in vol %)} \beta$$
$$\text{(gas flow rate in mol/s/cm}^2\text{)} \beta \text{(treatment time in seconds)} \quad \text{(formula (β))}.$$

2. The method according to claim 1, wherein the viscosity is from $1.5 \times 10^4$ to $5.0 \times 10^5$ Pa·s.

3. The method according to claim 1, wherein the viscosity is from $1.5 \times 10^4$ to $3.3 \times 10^7$ Pa·s.

4. The method according to claim 1, wherein a fluorine atom concentration in the gas or liquid comprising hydrogen fluoride is from 0.1 vol % to 15 vol %.

5. The method according to claim 1, wherein an amount of the gas or liquid comprising hydrogen fluoride blown to the glass ribbon is from $1 \times 10^{-6}$ to $5 \times 10^{-3}$ mol per cm² of the glass ribbon.

6. The method according to claim 1, wherein a top surface of the obtained float glass has a density of concave parts of 6/μm² or less.

7. A method for manufacturing a float glass, comprising:
melting a glass raw material to obtain melted glass,
forming the melted glass into a glass ribbon while floating the melted glass on a molten metal, and
annealing the glass ribbon,
wherein in the forming, a gas or a liquid comprising a molecule comprising a fluorine atom is blown to the glass ribbon having a viscosity of from $1.5 \times 10^4$ to $5.0 \times 10^5$ Pa·s, and
wherein an amount of the gas or liquid blown to the glass ribbon is from $1 \times 10^{-6}$ to $5 \times 10^{-3}$ mol per cm² of the glass ribbon.

8. The method according to claim 7, wherein the molecule comprising a fluorine atom is hydrogen fluoride or Freon.

9. The method according to claim 7, wherein a fluorine atom concentration in the gas or liquid comprising a molecule comprising a fluorine atom is from 0.1 vol % to 15 vol %.

10. The method according to claim 7, wherein a top surface of the obtained float glass has a density of concave parts of 6/μm² or less.

* * * * *